Figure 1:
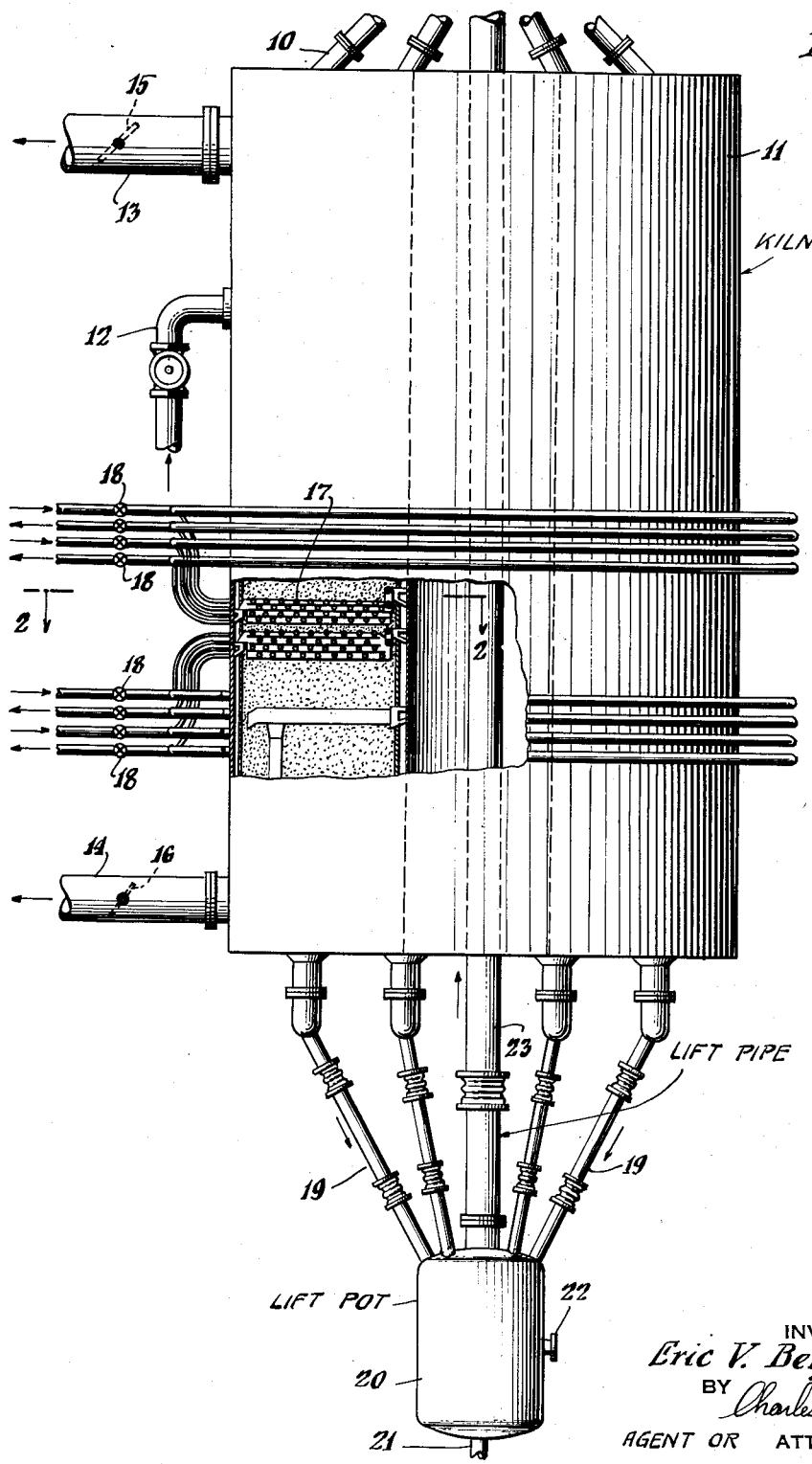

Nov. 23, 1954  E. V. BERGSTROM  2,695,220
KILN
Filed Sept. 27, 1950  3 Sheets-Sheet 1

INVENTOR
*Eric V. Bergstrom*
BY
AGENT OR ATTORNEY

Nov. 23, 1954  E. V. BERGSTROM  2,695,220
KILN

Filed Sept. 27, 1950  3 Sheets-Sheet 2

INVENTOR
Eric V. Bergstrom
BY Charles A. Huggett
AGENT OR ATTORNEY

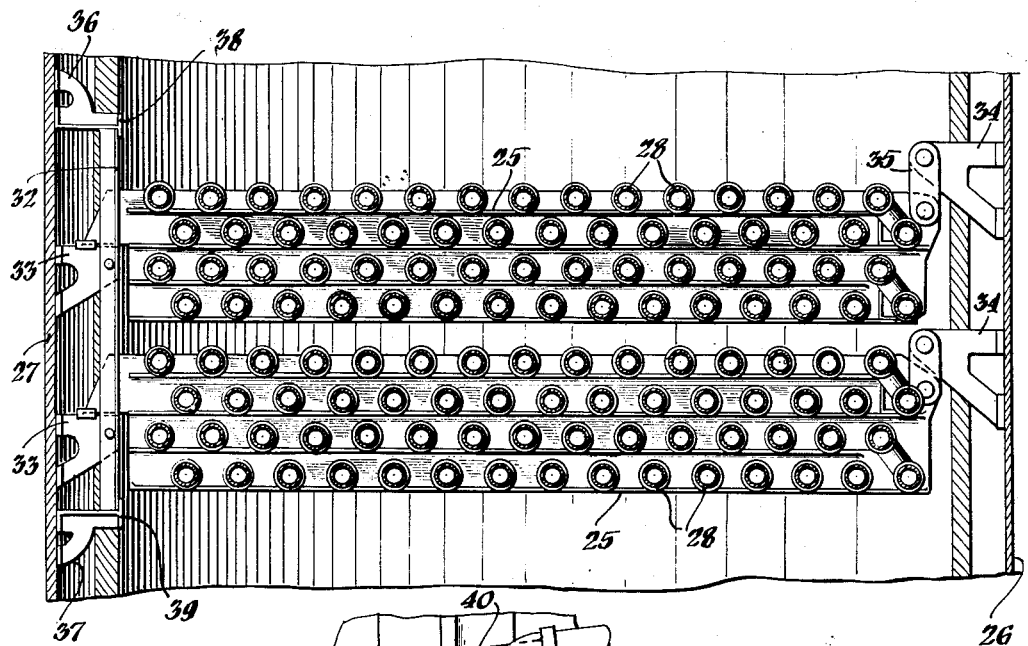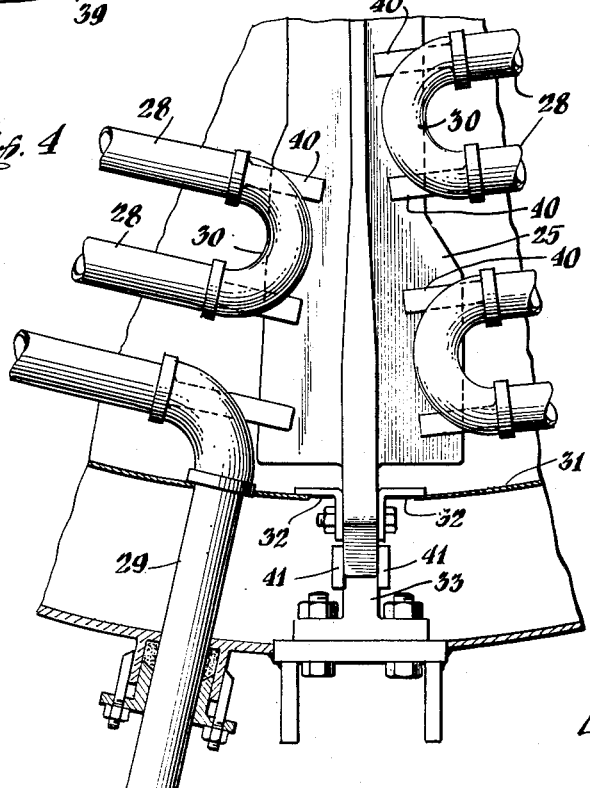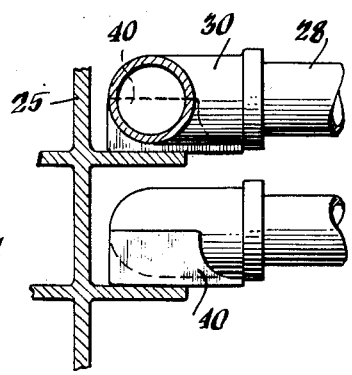

United States Patent Office 2,695,220
Patented Nov. 23, 1954

2,695,220

KILN

Eric V. Bergstrom, Short Hills, N. J., assignor to Socony-Vacuum Oil Company, Incorporated, a corporation of New York Application September 27, 1950, Serial No. 186,953

5 Claims. (Cl. 23—288)

This invention relates to apparatus for burning a carbonaceous deposit from the surface of a granular contact mass, and is more particularly directed to a simplified regeneration vessel in which spent solid catalyst particles are continuously reactivated.

A variety of processes are known to the petroleum industry which involve contacting gases or liquids with a particle-form solid contact material, such as, for example, catalytic hydrogenation, dehydrogenation, desulfurization, alkylation, polymerization, reforming and cracking. Typical of such processes is the catalytic cracking of heavy hydrocarbons to lighter hydrocarbons in the gasoline boiling range by passing the hydrocarbons into contact with a hot solid adsorptive catalytic contact mass under reaction conditions.

Usually such contact masses partake of the nature of natural clays, treated clays or synthetic associations of silica, alumina, or silica and alumina or chromia, any of which may or may not have other constituents added such as certain metallic oxides. These particles may be regular or irregular in shape, but regular shapes are preferred, such as, spheres or beads, pellets and pills, etc. The term granular is used to refer to particle-form material which is both regular and irregular in shape. The size may range from 3–60 mesh, Tyler screen analysis, but may preferably range from 4–15 mesh Tyler.

In the moving bed system of catalytic conversion, the granular mass is passed downwardly through a reaction vessel as a substantially compacted column wherein it is contacted with hydrocarbons and downwardly through a regeneration vessel as a substantially compact column wherein it is contacted with a combustion supporting gas such as air. The conversion of the hydrocarbons effected in the reaction vessel causes the lay down of coke or carbonaceous deposits on the surface of the catalyst, thereby reducing the active surface area of the adsorbent material. The spent particles are removed from the bottom of the reaction column and introduced onto the top of the regeneration column continuously. The coke deposit on the catalyst is removed in the regeneration vessel or kiln by combustion in the presence of air. The regenerated contact material is continuously removed from the bottom of the regeneration column and introduced onto the top of the reaction column, completing an enclosed circuit.

When the coke deposits burn in the kiln, the temperature of the mass rises at a rapid rate. The catalytic activity of the catalyst particles is affected by abnormally high temperature, for example, temperatures much in excess of 1200° F. or thereabouts. This was prevented in prior kilns by dividing the kiln vertically into a number of sections or stages. Each stage comprised a burning section in the absence of cooling where the temperature of the mass rose, followed by a cooling section, with or without continued burning, where heat was extracted from the mass. The cooling was effected by indirect heat exchange cooling coils through which a cooling fluid was passed. In practice these kilns may possess as many as ten or more stages. Since the installation of heat exchangers in such vessel is expensive and these exchangers provide difficult replacement and repair problems, ways of simplifying the kiln has been sought. Typical kilns of the prior moving bed process may have a square cross-section of about 8–12 feet on a side, and a vertical height of about 100 feet or more. The high elevation of these vessels made requisite a great mass of supporting steel and/or concrete. Any saving in height of the kiln, therefore, may result in substantial saving in installation expense.

Recently, the catalytic conversion process has been revised by increasing the rate of circulation of the catalyst several times over that used previously. By this expedient, the residence time of the catalyst in the reactor is reduced to such an extent that materially less coke is deposited on the surface of each volume of catalyst particles. This may be controlled to prevent the temperature of the catalyst from rising above the heat damaging level in the kiln because of the smaller amount of coke per unit of catalyst. By this procedure, a simplified kiln can be utilized with the cooling localized in a single region as compared with former kilns of approximately 8–10 alternate burning and cooling zones. This results in a simplification of the kiln and improvement in installation economy.

For example, these processes may operate at catalyst to oil ratios of about 1–10 volumes of catalyst introduced into the reactor per volume (at 60° F.) of oil introduced, and space velocities of about 0.5–5 volumes of oil (at 60° F.) per hour introduced into the reactor per volume of catalyst filled space therein. The reactor may be operated at an average temperature of about 850–950° F., catalyst inlet temperature to the reactor being about 900–1100° F. and charge inlet temperature being about 700–950° F. When the charge is introduced in liquid form the temperature, generally, is maintained more nearly 700° F. than 950° F., to prevent thermal cracking of the charge prior to introduction into the reactor, and may even be charged in cold conditions, if desired. The catalyst circulation rate is maintained high enough to prevent the coke deposition on the catalyst from exceeding about 1.0 per cent of the weight of the catalyst when synthetic catalytic materials are used, such as silica beads, and about 0.75 per cent of the weight of the catalyst when natural or treated clays are used as the catalytic mass material. The kiln temperature can, thereby, be retained below the maximum of about 1400° F. for the synthetic material or about 1200° F. for the clay material. These temperatures represent maximum safe limits for the two major types of catalytic mass material.

In order to introduce sufficient oxygen into the bed of spent contact material to regenerate all the material in a single region without causing the mass to boil or contact material to be lost through entrainment in the exhaust gases, the cross-sectional area of the kiln was increased. Formerly, the kilns were of rectangular or square cross-section with the cooling tubes attached at each side of the vessel. The dimensions were such that the tubes used, for example, say 2 inch diameter tubes, could span the vessel without danger of damage because of the heavy load of the contact mass thereabove. If the cross-section of the vessel were increased however, elaborate bracing would be necessary to strengthen the vessel and properly support the cooling tubes because of the longer beam span. In order to obviate these difficulties, and also to provide other advantages, a kiln of doughnut or annular-shaped cross-section was perfected. The span of the cooling tubes was kept sufficiently small by an unusual design hereinafter disclosed in detail. The annular shape of the vessel has several inherent advantages, such as easier fabrication, greater structural strength, and elimination of corners allowing more uniform downward flow of contact material. The disadvantage has been the difficulty of supplying cooling coils uniformly across a surface of annular cross-section, and the great difficulty of repairing such coils. The cooling tubes in a multizone kiln are constantly cut in and out of service to meet the cooling requirements of the catalyst. These requirements vary from time to time, depending upon operating temperatures, catalyst activity, type of feed stock, etc. Although not frequent, there are occasions when tubes must be replaced because of damage, caused, generally, by sudden changes in temperature in the metal. These repairs are laborious and expensive.

The object of this invention is to provide a simplified kiln adapted to regenerate the catalyst for the above-described conversion system.

A further object of this invention is to provide a simplified kiln for a moving bed conversion system which is much shorter than prior commercial kilns of equivalent capacity.

A further object of this invention is to provide a simplified kiln of annular cross-section having a cooling section which is easily assembled and serviced.

Figure 2:
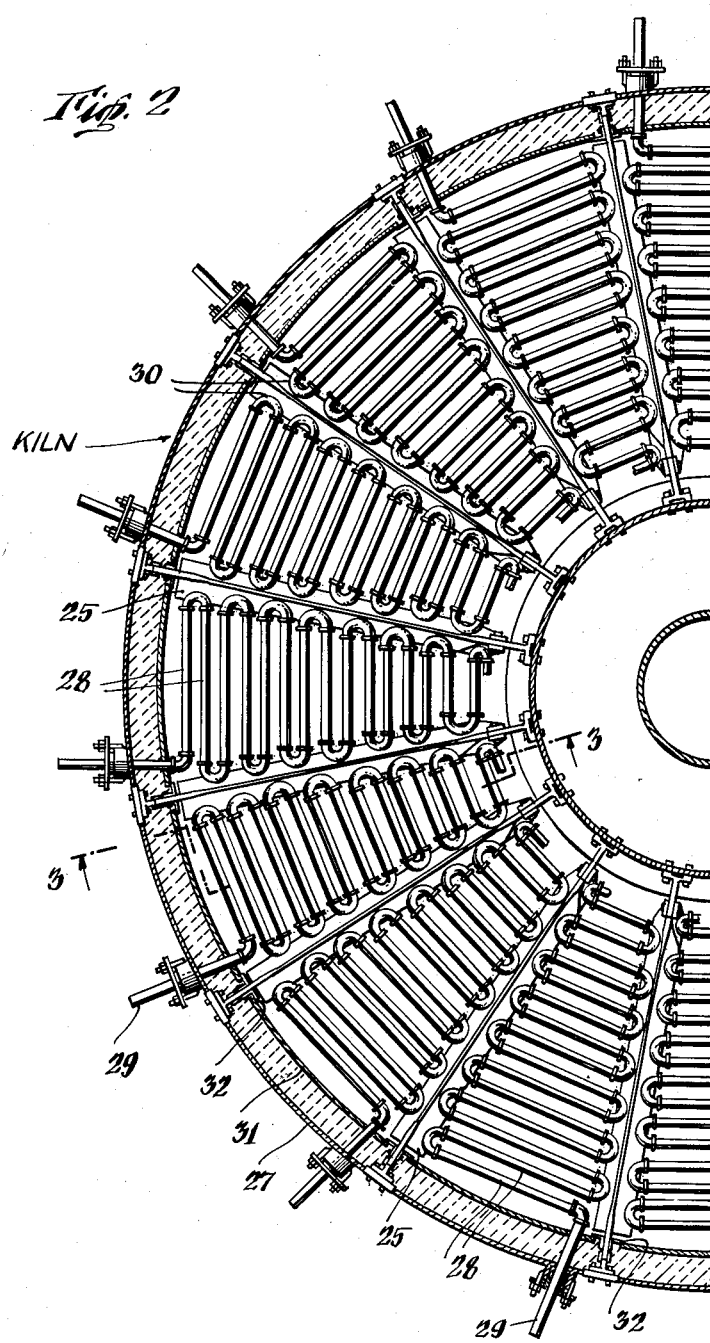

A further object of this invention is to provide a cooling section for a kiln having an annular cross-section in which separate cooling coils may be readily removed for repair and replacement. These and other objects will be made apparent in the following discussion, read in conjunction with the attached sketches, all highly diagrammatic in form; in which Figure 1 is a vertical view of the annular or doughnut kiln, a portion of which is shown in section and, in which Figure 2 is a plan view of a portion of the kiln cross-section taken on plane 2—2 of Figure 1; and in which Figure 3 is a vertical sectional view of a portion of the kiln showing the cooling coils and their support means, taken on section 3—3 of Figure 2 and; in which Figure 4 is a fragmentary sketch of the plan view of Figure 2, showing in detail the cooling coil support on the support bracket and; in which Figure 5 is a fragmentary vertical view, showing in detail the cooling coil support on the support bracket.

One application of the improved moving bed catalytic conversion system utilizes a gas lift in conjunction with a superimposed reactor-regenerator combination. Using the doughnut style kiln, it is found advantageous to route the lift leg of the gas lift through the center of the kiln to a location above the reactor. This arrangement permits the contact material to be drawn from the bottom of the kiln through substantially vertical conduits of equal length located about the bottom of the kiln. This procedure provides satisfactory seal legs, adapted to feed the contact material into the gas lift pot without undesirable lateral catalyst flow. The catalyst is gravitated from the top of the lift through a feed leg into the top of the reactor. After gravitation through the reactor, the fouled contact material is withdrawn through conduits 10, 10 into the top of the kiln 11 as shown on Figure 1.

The contact material is suitably introduced into the annular region of the kiln forming a gravitating pile. Combustion supporting gas, such as air, is introduced through the conduit 12 and suitable gas introducing means into the bed to burn off the coke deposits on the catalyst. The gas travels both up and down through the bed into two separate streams from the gas introducing means and is withdrawn at the top through the conduit 13 and at the bottom through the conduit 14. The valves 15, 16 in the conduits 13, 14 are used to balance the flow of gases through the upper and lower sections of the kiln. The contact material passes around the cooling pipes 17 in the lower section of the kiln. The pipes are arranged in banks on a multitude of levels, each coil, of hairpin type, being connected to appropriate inlet and outlet headers which surround the exterior of the vessel. Each header is separately connected to an inlet or outline line, completing the circulation path for the cooling fluid. The inlet and outlet lines are equipped with valves 18, 18 for controlling the flow of cooling fluid through the various levels of the heat exchanger. By cutting in or out various levels of the heat exchanger, the temperature of the contact material discharged from the kiln may be adjusted.

The contact material is withdrawn from the bottom of the kiln through the conduits 19, 19 to the lift pot 20. Steam, air or flue gas is introduced into the lift pot 20 through the conduits 21, 22 to lift the contact material upwardly through the lift leg 23.

Referring now to Figure 2, a plan view of a portion of the cross-section of the kiln is shown, illustrating the arrangement of the cooling hairpin coils. The radial shelf-supports 25 connect between the inner 26 and outer 27 wall of the kiln 11, dividing the cross-section into pie sectors. The shelf-supports are placed close enough together so that the span of the pipes 28 is relatively short at the longest location, and hence, the pipes are capable of withstanding the downward pressure of the catalyst mass. For example, the central angle of the pie sector may vary broadly from about 25° to about 50°, and preferably from about 30° to about 45°.

Each hairpin coil comprises an upper and lower level or bank of tubes. The cooling fluid is introduced through the conduit 29 and passes through the straight sections and connecting 180 degree of reversing elbows 30 which connect the ends of the straight sections 28, to the center of the kiln. At the center the tubes are connected with a similar set of tubes located therebelow, adapted to conduct the cooling fluid out of the kiln. The reversing elbows 30 have lugs attached to their lower sides providing flat surfaces which bear upon the shelves of the radial shelf-supports 25, serving to transfer the load from the hairpin coils to the shelf-supports. The lugs are free to slide on the shelves of the shelf-supports, thereby allowing for expansion and contraction of the coil, preventing the setting up of undesirable stresses in the coil. The straight sections of the coil 28 are of uniformly decreasing length, from the outer end of the coil to the inner end thereof. This produces the general pie-shape of the hairpin coils. As previously described, the inlet and outlet tubes 29 connect with circular headers located around the exterior of the vessel. When it is desired to remove a bank of tubes, the inlet and outlet tubes are disconnected from their headers, and a section of the outer wall or the welded cover plate 27 is cut away, adjacent the bank to be removed. The insulation is then removed adjacent the bank, exposing the inner plate 31. The inner plate 31 is held in place against the flanges of the angle irons 32 by the insulation material, and hence, can be simply removed after the insulation is broken out or displaced. This permits the removal of the hairpin coil, the unit being slid along the shelves of the shelf-support, providing easy withdrawal and replacement.

Referring now to Figure 3, a portion of the kiln is shown in cross-section, illustrating how the shelf-supports 25 are hinged at the inner ends and locked at the outer ends. The shelf-supports are held in position by the inner brackets 34 and outer brackets 33, which are attached to the inner wall 26 and outer wall 27 of the vessel. The hinges 35 permit the shelf-supports to expand and contract under the influence of changing temperature, thereby avoiding undesirable thermal stresses in the shelf-supports. The shelf-supports 25 are seen to possess vertical beams with 4 lateral shelves on each side adapted for supporting four banks of tubes or two complete coils between adjacent shelf-supports. There are two layers of shelf-supports, one located above the other, providing four superimposed hairpin coils located in each pie-sector. The brackets 36, 37 provide attachment for the angle irons 32, 32 and are equipped with lips 38, 39 which are adapted to retain the inner plates at the top and bottom thereof.

A suitable vessel incorporating the disclosed hairpin cooling coils may suitably be about 40 feet high and 24 feet in diameter. The distance between the inner and outer wall of the kiln may be about 8 feet, the diameter of the central hole being about 8 feet. The contact material may be introduced into the top of the vessel at about 750–850° F. The temperature rises as the carbonaceous deposits are burned from the surface reaching a maximum of about 1200–1400° F. above the cooling coils. The temperature of the contact material is held constant or reduced by extracting heat through the cooling coils, being discharged from the bottom of the vessel at about 950–1050° F.

Referring to Figure 4, an enlarged fragmentary plan view of the shelf-support is shown. This view shows clearly the lugs 40 mounted on the reversing elbows 30 and adapted to slide on the shelves of the shelf-support. The lock 41 is attached to the outer ends of the shelf-supports adapted to lock the shelf-supports in the brackets 33, 33.

Referring to Figure 5, a fragmentary side elevational view of the shelf-support and supported cooling coils is shown. It is seen that the lugs 40 have adequate flat surface contact with the shelves of the shelf-support and sufficient clearance is left between the ends of the coils and the vertical beam wall of the shelf-supports to permit the coils to enlarge when heated.

As an illustration of the invention, the above described kiln operated in a T. C. C. moving bed system, using silica beads with chromia added of about ¼ to ⅜″ diameter, and the following operating conditions:

Reactor throughput, bbls. per stream day_____ 15,500
Catalyst circulation, tons per hour_____ 350

Oil inlet temperature, ° F.:
  Vapor (80 per cent of charge) _____ 820
  Liquid (20 per cent of charge) _____ 700
Catalyst inlet temperature to reactor _____ 1,070
Space velocity, volumes of charge at 60° F. per hour per volume of catalyst-occupied, reactor space _____ 1.1
Catalyst to oil ratio, volumes per volume (at 60° F.) _____ 4.5 has to burn about 7500 pounds per hour of coke when using a wide-cut, gas oil representing 47.5 to 92.5% volume of Kansas crude. The temperature in the simplified kiln does not exceed a maximum of 1250° F. for the beads when the system is operated as above indicated. The yield is 37.3 per cent by volume of motor gasoline having an octane rating of 92.6 CFR (Research).

The above illustrations are not intended to limit the invention. The only limitations intended are found in the appended claims.

What is claimed is:

1. In a kiln of annular cross-section through which a granular contact material is gravitated as a substantially compact mass and in which the solids are contacted with a combustion supporting gas to effect the burning of deposits on the solids, improved heat exchanging means comprising a plurality of shelf-supports within said annular vessel arranged in a radial pattern at a common level, said shelf-supports comprising vertical beams with horizontal shelves attached to each side of the beams, one end of each beam being positively attached to a wall of the vessel, a hinge attached between the other end of the beam and the other wall of the vessel, so as to permit longitudinal movement of the shelf-supports, wedge-shaped tube bundles slidably supported on the shelves of adjacent shelf-supports, each tube bundle being an independent heat exchanging unit, whereby individual tube bundles can be slid outwardly on the shelves and removed through the outer wall of the vessel for repair and replacement.

2. In the kiln of claim 1, said wedge-shaped heat exchanger bundles comprising straight pipe sections, reversing elbows attached to the ends of the straight sections, so as to provide a continuous conduit, the straight pipe sections being uniformly smaller from the exterior of the tube bundle to the interior thereof, each tube bundle possessing an upper and lower level of tubes, a connecting pipe attached between the upper and lower level of tubes adjacent the smallest of the straight pipe sections, outwardly directed conduits attached to the upper and lower level of tubes adjacent the longest of the straight pipe sections, so as to provide inlet and outlet conduits for the tube bundle, and flat lugs attached to the reversing elbows of the tube bundle, so as to provide a bearing surface which slidably contacts the shelves of the shelf-supports.

3. In the kiln of claim 1, brackets attached to the inner wall of the annular vessel above and below the level of the heat exchanging tube bundles at locations uniformly spaced about the interior of the vessel, angle iron members attached to said brackets and arranged to provide a rectangular frame about each heat exchanging tube bundle at a spaced distance from the outer wall of said vessel, rectangular plates located in said angle iron frames and held in position by insulation material between said plate and the outer wall of the vessel, so that when a hole is cut in the outer wall of the vessel adjacent one of the tube bundles and the insulation material removed, the rectangular plate is easily removed allowing the tube bundle to be slid out for repair and replacement.

4. Claim 1 with the additional limitations that the shelf-supports are located in the lower portion of the vessel and the shelf-supports are distributed around the vessel forming equal central angles of about 30–45 degrees.

5. In a kiln of annular cross-section through which a granular contact material is gravitated as a substantially compact mass and in which the solids are contacted with a combustion-supporting gas to effect the burning of deposits on the solids, improved heat-exchanging means comprising a plurality of shelf-supports within said annular vessel arranged in a radial pattern at a common level, said shelf-supports comprising vertical beams with horizontal shelves attached to the side of the beams, one end of each beam positively attached to the wall of the vessel, a hinge attached between the other end of the beam and the other wall of the vessel, so as to permit longitudinal movement of the shelf-supports, wedge-shaped tube bundles slidably supported on the shelves of adjacent shelf-supports, each tube bundle being an independent heat-exchanging unit, whereby individual tube bundles can be slid outwardly on the shelves and removed through the outer wall of the vessel for repair and replacement.

References Cited in the file of this patent

UNITED STATES PATENTS

| Number | Name | Date |
|---|---|---|
| 1,134,762 | Schaffer | Apr. 6, 1915 |
| 1,617,083 | Price | Feb. 8, 1927 |
| 1,765,970 | Derry | June 24, 1930 |
| 1,775,079 | Jones | Sept. 2, 1930 |
| 1,868,512 | Ahlmann | July 26, 1932 |
| 2,003,705 | Whiteley | June 4, 1935 |
| 2,518,270 | Barr | Aug. 8, 1950 |

FOREIGN PATENTS

| Number | Country | Date |
|---|---|---|
| 227,836 | Switzerland | Oct. 1, 1943 |